United States Patent
Colaianna et al.

(10) Patent No.: US 10,370,462 B2
(45) Date of Patent: Aug. 6, 2019

(54) MELT-PROCESSABLE PERFLUOROPOLYMERS HAVING IMPROVED THERMAL AND MECHANICAL PROPERTIES AFTER HEATING TREATMENT

(71) Applicant: SOLVAY SPECIALTY POLYMERS ITALY S.P.A., Bollate (IT)

(72) Inventors: Pasqua Colaianna, Milan (IT); Valeriy Kapelyushko, Alessandria (IT); Mattia Bassi, Milan (IT); Marco Mirenda, Rho (IT); Vincenzo Arcella, Nerviano (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 0 days.

(21) Appl. No.: 15/316,083

(22) PCT Filed: Jun. 2, 2015

(86) PCT No.: PCT/EP2015/062192
§ 371 (c)(1),
(2) Date: Dec. 2, 2016

(87) PCT Pub. No.: WO2015/185520
PCT Pub. Date: Dec. 10, 2015

(65) Prior Publication Data
US 2017/0107305 A1    Apr. 20, 2017

(30) Foreign Application Priority Data
Jun. 5, 2014  (EP) .................................... 14171342

(51) Int. Cl.
| | | |
|---|---|---|
| C08L 27/18 | (2006.01) | |
| C08J 7/00 | (2006.01) | |
| C08F 6/00 | (2006.01) | |
| B29C 71/02 | (2006.01) | |
| C08F 214/26 | (2006.01) | |
| C08F 6/28 | (2006.01) | |
| B29C 35/04 | (2006.01) | |

(52) U.S. Cl.
CPC ................ C08F 6/00 (2013.01); B29C 71/02 (2013.01); C08F 6/28 (2013.01); C08F 214/26 (2013.01); C08F 214/262 (2013.01); C08F 214/265 (2013.01); C08J 7/08 (2013.01); B29C 35/045 (2013.01); B29C 2071/022 (2013.01); C08J 2327/18 (2013.01)

(58) Field of Classification Search
CPC ........... C08L 27/18; C08J 7/08; C08J 2327/18
See application file for complete search history.

(56) References Cited

U.S. PATENT DOCUMENTS

| | | | | |
|---|---|---|---|---|
| 5,703,185 A | * | 12/1997 | Blair | H01B 3/445 264/210.1 |
| 7,335,721 B2 | * | 2/2008 | Alberg | C08J 7/08 264/115 |
| 9,988,476 B2 | * | 6/2018 | Colaianna | C08F 214/262 |
| 2010/0036074 A1 | | 2/2010 | Aten et al. | |
| 2012/0031607 A1 | | 2/2012 | Lahijani | |
| 2012/0034406 A1 | | 2/2012 | Lahijani | |
| 2012/0035326 A1 | * | 2/2012 | Lahijani | C08L 27/18 525/200 |
| 2014/0308468 A1 | * | 10/2014 | Burch | C08J 7/08 428/36.6 |
| 2015/0274868 A1 | * | 10/2015 | Hintzer | C08L 27/18 524/805 |

FOREIGN PATENT DOCUMENTS

| | | |
|---|---|---|
| WO | 2012019070 A1 | 2/2012 |
| WO | 2014086694 A1 | 6/2014 |

OTHER PUBLICATIONS

Pianca M. et al.,"End groups in fluoropolymers", Journal of Fluorine Chemistry, 1999, vol. 95, p. 71-84—Elsevier Science S.A.

* cited by examiner

Primary Examiner — Rip A Lee

(57) ABSTRACT

The invention mainly pertains to a method for heat treating a composition [composition (C)] which contains at least one melt-processible perfluoropolymer [polymer (F)] formed of tetrafluoroethylene (TFE) copolymer with one or more perfluorinated comonomers [comonomer (F)] containing at least one unsaturation of ethylene type in amounts from 0.5% to 13% by weight, preferably from 0.6% to 11% by weight, and more preferably from 0.8% to 9% by weight; said polymer (F) possessing reactive end groups comprising at least one of the group consisting of hydrogen atoms, oxygen atoms and ethylenically unsaturated double bonds in an amount of at least 4.5 mmol/kg, the process comprising at least the step of heat-treating the composition (C) at a temperature of at least 260° C.

17 Claims, No Drawings

MELT-PROCESSABLE PERFLUOROPOLYMERS HAVING IMPROVED THERMAL AND MECHANICAL PROPERTIES AFTER HEATING TREATMENT

CROSS-REFERENCE TO RELATED APPLICATION

This application is a U.S. national stage entry under 35 U.S.C. § 371 of International Application No. PCT/EP2015/062192 filed Jun. 2, 2015, which claims priority to European application No. EP 14171342.0 filed Jun. 5, 2014. The entire contents of these applications are explicitly incorporated herein by this reference.

TECHNICAL FIELD

The invention mainly pertains to a process for heat treating a melt-processable perfluorinated tetrafluoroethylene polymer to improve its thermal and mechanical properties, and the polymer products obtained after said heating treatment.

BACKGROUND ART

The tetrafluoroethylene/perfluoro(alkyl vinyl ether) copolymers, commercially known as PFA, are melt-processable polymers characterized by a high melting point, high thermal stability, chemical inertness and low dielectric constant, as well as good mechanical properties at room and elevated temperature. Generally, a commercial PFA polymer has a melting point of approximately 305° C. and a continuous use temperature of 260° C., wherein the parameter of continuous use temperature indicates the highest operating temperature the polymer can continuously withstand. Therefore, PFA polymers are widely used in industrial applications which require a high operating temperature and possibly a chemically aggressive environment, such as transportation pipes and heat exchanger in chemical process industry, communication cables for some extreme environments, and flexible risers operating at high temperatures.

Nevertheless, in many real-world industry applications in the oil and gas field, the need has been felt to have melt-processable polymer materials having a continuous use temperature beyond 260° C., to withstand extremely high operating temperatures encountered in construction work and the like. For instance, with deep drilling, a data communication cable can be exposed to temperatures of 280° C. or higher in a downhole well.

Recently, to address this limitation, related patent applications US 2012/0034406 (E. I. DU PONT DE NEMOURS AND COMPANY) Feb. 9, 2012, US 2012/0035326 (E. I. DU PONT DE NEMOURS AND COMPANY) Feb. 9, 2012, WO 2012/019070 (E.I. DUPONT DE NEMOURS AND COMPANY) Sep. 2, 2012 and US 2012/0031607 (E. I. DU PONT DE NEMOURS AND COMPANY) Feb. 9, 2012, proposed a process to modify the existing PFA polymer, by incorporating a melt flowable polytetrafluoroethylene (PTFE) into the original PFA polymer and thereafter heat treating the resultant composition at a temperature of at least 280° C., wherein the melt flowable PTFE is a low molecular weight polymer (LMW PTFE). According to the afore recited applications, incorporation of LMW PTFE in the original PFA polymer is necessary, for improving the latter's integrity during heat treatment exposure and enables the resultant composition to exhibit improved physical properties such as flex-life value and tensile strength, a desirably low MFI (melt flowing index), and a relatively high continuous use temperature (i.e. greater than 260° C.).

Nevertheless, the approach of the afore-recited applications requires: 1) the addition of selected LMW PTFE into the original co-polymer and 2) a fine-tune of the proportions between PFA and LMW PTFE for producing a desired result, which complicated the polymer modification process.

There is thus a need for a continuous search for new, simple approaches to modify the existing PFA polymer in order to improve its overall performance at room and elevated temperatures, in particular the properties like flex-life, MFI, tensile creep, barrier properties, and continuous use temperature.

WO 2014/086694 (SOLVAY SPECIALTY POLYMERS ITALY, S.P.A.) Dec. 6, 2014, discloses a method for heat treating certain melt-processable fluoropolymers, in the absence of any PTFE. Nevertheless, this document is barely silent on the end group content of the melt-processable fluoropolymers thereby submitted to heat treatment.

SUMMARY OF INVENTION

The present invention provides a new solution to improve the overall performance (e.g. thermal and mechanical-physical properties) of a melt-processible perfluorinated tetrafluoroethylene copolymer, more particularly of a polymer formed of tetrafluoroethylene (TFE) copolymer with one or more perfluorinated comonomers. For the purpose of the present invention, a "melt-processible" polymer refers to a polymer that can be processed (i.e. fabricated into shaped articles such as films, fibers, tubes, fittings, wire coatings and the like) by conventional melt extruding, injecting or coating means. This generally requires that the melt viscosity of the polymer at the processing temperature be no more than $10^8$ Pa×sec, preferably from 10 to $10^6$ Pa×sec.

Specifically, in a first aspect, the invention pertains to a method for heat treating a composition [composition (C)] which contains at least one melt-processable perfluoropolymer [polymer (F)] formed of tetrafluoroethylene (TFE) copolymer with one or more perfluorinated comonomers [comonomer (F)] containing at least one unsaturation of ethylene type in amounts from 0.5% to 13% by weight, preferably from 0.6% to 11% by weight, and more preferably from 0.8% to 9% by weight; said polymer (F) possessing reactive end groups comprising at least one of the group consisting of hydrogen atoms, oxygen atoms and ethylenically unsaturated double bonds in an amount of at least 4.5 mmol/kg, the process comprising at least the step of heat-treating the composition (C) at a temperature of at least 260° C.

The Applicant has surprisingly found that, without the need of adding a melt flowable PTFE as taught in the prior art, the polymer compositions subjected to the aforedescribed heat-treating process showed superior overall performance, including: a remarkably increased flex life accompanied with a decreased MFI, an increase in crystallinity as demonstrated by a higher first melting enthalpy, improved tensile properties and creep behaviour, a higher continuous use temperature above 260° C., as well as an enhanced permeation resistance, compared to the original composition (C) before the heat-treating process. Noticeably, the heat-treated polymer composition exhibits a satisfactory mechanical strength when exposed to a temperature higher than the continuous use temperature of the original composition (C).

Without being bond by this theory, the Applicant is of the opinion that improvements of overall performances are related to not better defined reactions occurring at said reactive end groups. This is particularly meaningful in this perfluoropolymer area, wherein fluorination of end groups for generating fully fluorinated terminations of —CF$_3$ type, deprived of hydrogen, oxygen or ethylenically unsaturated double bonds, is generally recommended treatment for these materials for delivering best performances.

The polymer (F) possesses reactive end groups comprising at least one of the group consisting of hydrogen atoms, oxygen atoms and ethylenically unsaturated double bonds in an amount of at least 4.5 mmol/kg, preferably at least 5.0 mmol/kg, more preferably at least 5.4 mmol/kg.

As a result, said heat-treating process advantageously produces polymer compositions suitable for use at high operating temperature (e.g. above 260° C.) and extreme working environments. Particularly, said heat-treating process can be readily applied to a solid polymer composition, such as a solid shaped article manufactured from a molten polymer mixture, and increases the mechanical and barrier properties of the solid composition. For instance, said heat-treating process can be conveniently applied to a polymer membrane product to reduce its gas permeability and improve other thermo-mechanical properties thereof.

Preferably, the polymer (F) of the present invention is semi-crystalline. For the purpose of the present invention, the term "semi-crystalline" is intended to denote a polymer having a heat of fusion of more than 1 J/g when measured by Differential Scanning calorimetry (DSC) at a heating rate of 10° C./min, according to ASTM D 3418. Preferably, the semi-crystalline polymer (F) of the invention has a heat of fusion of at least 15 J/g, more preferably of at least 25 J/g, most preferably at least 35 J/g.

The polymer (F) comprises advantageously more than 0.5% wt, preferably more than 2.0% wt, and more preferably at least 2.5% wt of comonomer (F).

The polymer (F) as above detailed comprises advantageously at most 20% wt, preferably at most 15% wt, and more preferably 10% wt of comonomer (F).

Good results have been obtained with the polymer (F) comprising at least 0.7% wt and at most 10% wt of comonomer (F).

Among suitable comonomers for comonomer (F), mentions can be made of:
C$_3$-C$_8$ perfluoroolefins, e.g. hexa-fluo-ro-propene (HFP), hexa-fluoroi-so-bute-ne;
CF$_2$=CFOR$_f$ perfluoroalkylvinylethers (PAVE), wherein R$_f$ is a C$_1$-C$_6$ perfluoroalkyl, e.g., —CF$_3$, —C$_2$F$_5$, or —C$_3$F$_7$;
CF$_2$=CFOX perfluorooxyalkylvinylethers wherein X is a C$_1$-C$_{12}$ perfluorooxyalkyl having one or more ether groups; and
perfluorodioxoles.
Preferably, said comonomer (F) is selected from the following comonomers:
PAVEs of formula CF$_2$=CFOR$_{f1}$, wherein R$_{f1}$ is selected from —CF$_3$, —C$_2$F$_5$, and —C$_3$F$_7$, namely, perfluoromethylvinylether (PMVE of formula CF$_2$=CFOCF$_3$), perfluoroethylvinylether (PEVE of formula CF$_2$=CFOC$_2$F$_5$), perfluoropropylvinylether (PPVE of formula CF$_2$=CFOC$_3$F$_7$), and mixtures thereof;
perfluoromethoxy vinyl ether (MOVE) of general formula CF$_2$=CFOC-F$_2$ OR$_{f2}$, wherein R$_{f2}$ is a linear or branched C$_1$-C$_6$ perfluoroalkyl group, cyclic C$_5$-O$_6$ perfluoroalkyl group, a linear or branched C$_2$-O$_6$ per-fluoroxyalkyl group; preferably, R$_{f2}$ is —CF$_2$CF$_3$ (MOVE1), —CF$_2$CF$_2$ OCF$_3$ (MOVE2), or —CF$_3$ (MOVE3); and
perfluorodioxoles having the following formula:

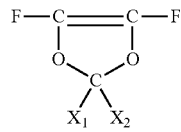

wherein X$_1$ and X$_2$, equal to or different from each other, are selected between F and CF$_3$, preferably F.

Particularly, good results have been achieved with polymer (F) containing comonomer (F) selected from PMVE, PEVE, PPVE, MOVE, and combinations thereof.

Noticeably, the polymer (F) can be made using TFE and several PAVE monomers as comonomer (F), such as the TFE/PMVE/PPVE copolymer, sometimes referred to as MFA by the manufacturer, but included as PFA for the purpose of the present invention.

According to one embodiment, polymer (F) is advantageously a TFE copolymer consisting essentially of:
(a) from 0.5 to 8%, preferably from 0.7 to 6% by weight of recurring units derived from PPVE;
(b) recurring units derived from TFE, in such an amount that the sum of the percentages of the recurring units (a) and (b) is equal to 100% by weight.

The expression 'consisting essentially of' is used within the context of the present invention for defining constituents of a polymer to take into account end chains, defects, irregularities and monomer rearrangements which might be comprised in said polymers in minor amounts, without this modifying essential properties of the polymer.

Optionally, polymer (F) of the invention further comprises recurring units derived from at least one C$_3$-C$_8$ perfluoroolefin.

According to another embodiment of the invention, the polymer (F) is advantageously a TFE copolymer consisting essentially of:
(a) from 0 to 6% by weight of recurring units derived from PMVE;
(b) from 0.4 to 5% by weight of recurring units derived from one or more than one fluorinated PAVE comonomer different from PMVE, preferably derived from PEVE and/or PPVE;
(c) from 0 to 6% by weight of recurring units derived from at least one C$_3$-C$_8$ perfluoroolefins, preferably derived from hexafluoropropylene (HFP); and
(d) recurring units derived from TFE, in such an amount that the sum of the percentages of the recurring units (a), (b), (c) and (d) is equal to 100% by weight.

Suitable polymer (F) for the present invention is commercially available from Solvay Specialty Polymers Italy S.p.A. under the trade name of HYFLON® PFA P and M series and HYFLON® MFA.

In one embodiment, the composition (C) of the invention contains polymer (F) as the sole component.

The composition (C) can be in the form of an article which is melt fabricated from the melt-processible polymer component(s) of the composition (C). For instance, the article can be selected from the following examples of articles: film, sheet, rods, pipes, cylinders, vessels, containers, wires & cables, and heat-exchanging tubes. The article can also be in the form of a modified melt-fabricated article such as convoluted tubing made from extruded tubing. Of particular interest are baskets and carriers and other articles injection molded from the composition (C), which would be used in chemical processing such as for carrying silicon wafers in semiconductor manufacture.

The composition (C) can also be in the form of extruded pellets, which can then be melt fabricated into the final form of the desired article.

The process of the present invention comprises at least the step of heat-treating the composition (C) at a temperature of at least 260° C., preferably in the absence of a melt flowable PTFE. For the purpose of the process of the present invention, the time of heat treatment for composition (C) will depend on the temperature of the heat treatment, and vice versa. Moreover, as apparent to one skilled in the art, the time of heat treatment for composition (C) can vary according to the practical requirement in the final product, or the size or bulk of the object being heat treated.

In general, the temperature of heat treatment for composition (C) in the process invention is preferably at least 270° C., more preferably at least 300° C., and most preferably at least 310-315° C. In this regard, the maximum temperature of heat treatment is generally such that the composition (C) is in the solid state during heat treatment, which means that the composition (C) does not flow and the original shape of the composition (C) is still discernible during and after the heat treatment is carried out.

Advantageously, as aforementioned, the heat-treating process of the present invention can be readily applied to a solid shaped article. In contrast with the conventional heat-treating processes which are applied to a molten article, the process of the present invention can conveniently treat an article in a well-defined shape as designed for the expected use.

In other terms, according to certain embodiments, the process of the invention comprises a step of processing in the molten state the composition (C), as above detailed, so as to provide a solid shaped article thereof, and consequently heat treating, as above detailed, said composition (C) under the form of said solid shaped article.

Accordingly, in practicing the process of the invention, the maximum temperature of heat treatment is usually set below the initial melting temperature of the composition (C), and/or below the first melting temperature of the polymer (F).

Typically, the process of the invention comprises the step of heat-treating the composition (C) at a temperature of at least 260° C. Heating composition (C) for at least 3 hours or even longer time can produce further improvement in certain desired thermal/mechanical properties at high temperature, such as flex life (folding endurance) of the resultant composition. Preferably, the heating period of the heat treatment for composition (C) is at least 1 day, more preferably at least 2 days, and could run up to 4 days or even weeks. In a specific embodiment, the process of the invention comprises the step of heat-treating the composition (C) at a temperature of at least 300° C., for at least 2 days. In another preferred embodiment, the process of the invention comprises the step of heat-treating the composition (C) at a temperature of at least 310° C., for at least 2 days.

Generally, the heat treatment step of the process of the invention is carried out in an oven, which may contain air or an inert gas (e.g. nitrogen, argon, . . . ) making up the medium enveloping the article.

According to the process of the present invention, the step of heat-treating the composition (C) is preferably performed in the absence of a melt flowable PTFE. By 'melt flowable' it is meant that the PTFE has a non-zero melt flow rate that is measurable by ASTM D 1238-94a. This melt flowable PTFE may be obtained by direct polymerization under conditions that prevent very long polymer chains from forming, or by irradiation degradation of non-melt flowable PTFE. This melt flowable PTFE can be homopolymer of TFE or a copolymer thereof with a small amount of comonomer having at least one functional group. For instance, referring to US 2010/0036074 (E. I. DU PONT DE NEMOURS AND COMPANY) Feb. 11, 2010, this melt flowable PTFE may be a copolymer of TFE with a hydrocarbon monomer having a carbon-carbon double bond and at least one functional group selected from the group consisting of amine, amide, carboxyl, hydroxyl, phosphonate, sulfonate, nitrile, boronate and epoxide, and more specifically may be a TFE copolymer having about 0.001 to about 1 weight percentage of at least one comonomer selected from the group consisting of chlorotrifluoroethylene, hexafluoropropylene, perfluoro-2,2-dimethyl-1,3-dioxole, perfluoro-2-methylene-4-methyl-1,3-dioxolane, perfluoro(methyl vinyl ether), perfluoro(ethyl vinyl ether), perfluoro(propyl vinyl ether) and perfluoro(butyl vinyl ether).

Such melt flowable PTFE is commonly called PTFE micropowder. It is not considered as being melt fabricable because the article molded from the melt is useless by virtue of extreme brittleness. An extruded filament of the PTFE micropowder is so brittle that it breaks upon flexing.

As the melt flowability of the melt flowable PTFE is generally considered as a result of its low molecular weight, it is referred as LMW PTFE in the aforementioned US patent applications of US 2012/0034406 (E. I. DU PONT DE NEMOURS AND COMPANY) Feb. 9, 2012, US 2012/0035326 (E. I. DU PONT DE NEMOURS AND COMPANY) Feb. 9, 2012, and US 2012/0031607 (E. I. DU PONT DE NEMOURS AND COMPANY) Feb. 9, 2012. In contrast, for the purpose of the invention, the non-melt flowable PTFE refers to the PTFE that has zero melt flow rate as measured by ASTM D 1238-94a, due to its high molecular weight relative to the melt flowable PTFE.

The LMW PTFE can also be characterized by high crystallinity, preferably exhibiting a heat of crystallization of at least 50 J/g.

The LMW PTFE has melt flowability, which for example can be characterized by a melt flow rate (MFR) of at least 0.01 g/10 min, preferably at least 0.1 g/10 min and more preferably at least 5 g/10 min, and still more preferably at least 10 g/10 min, as measured in accordance with ASTM D 1238, at 372° C., using a 5 kg weight on the molten polymer.

While the LMW PTFE has low molecular weight, it nevertheless has sufficient molecular weight to be solid up to high temperatures, e.g. at least 300° C., more preferably at least 310° C., even more preferably, at least 320° C. According to one embodiment, one indicator of this sufficient molecular weight is that the LMW PTFE forms a viscous melt, such that when the polymer is subjected to the MFR determination in accordance with ASTM D 1238 at 372° C., using a 5 kg weight, the MFR of the polymer is preferably no greater than 100 g/10 min, preferably no greater than 75 g/10 min, even more preferably, no greater than 50 g/10 min. Each of these highest MFR amounts can be combined with any of the lowest MFRs mentioned above to form MFR ranges, e.g. 0.01-50 g/10 min, 0.01-75 g/10 min, 10-50 g/10 min, etc.

The LMW PTFE can be obtained in the form of PTFE micropowder from Solvay Specialty Polymers Italy S.p.A.

under the trade name of Polymist® and Algoflon® L, or from DuPont Company under the trade name of ZONYL® fluoroadditive.

According to one preferred embodiment of the process invention, the step of heat-treating the composition (C) is performed in the absence of PTFE polymer, wherein the PTFE polymer can be a homopolymer of TFE or a copolymer of TFE with at least one other fluorine-containing monomer in a small amount, e.g. not larger than about 0.2% by weight. These PTFE polymers are commercially available from Solvay Specialty Polymers Italy S.p.A. under the trade name of Algoflon® PTFE and from DuPont Company under the trade name of Teflon®.

Standard polymer processing techniques as known in the art can be used in the method above mentioned, including but not limited to conventional melt extruding, injecting, and coating.

DESCRIPTION OF EMBODIMENTS

The invention will now be explained in more detail with reference to the following examples, whose purpose is merely illustrative and not intended to limit the scope of the invention.

EXAMPLE

Measurement of the Melt Flow Index (MFI)

The determination of the MFI was carried out according to the ASTM D1238 standard test method at 372° C. under a load of 5 Kg.

Measurement of the Second Melting Temperature, Tm(II)

The second melting temperatures of the test samples were determined based on the ASTM D4591 standard test protocol, using a heating rate of 10° C. per minute. For all samples, the second melting temperature [Tm(II)] was evaluated after a first melting cycle up to 350° C. and cooling from 350° C. using a cooling rate of 10° C. per minute.

Measurement of the Mechanical Properties

MIT flex life of the polymer was measured using the standard equipment described in ASTM D-2176-82T, on a moulded film having a thickness of approximately 0.3 mm.

Measurement of the Weight Percentage of the Perfluorinated Comonomer in the Polymer Determination of the perfluorinated comonomer content was carried out by FT-IR analysis and expressed as percent by weight.

The perfluorinated comonomer (F) content was determined under the following conditions: the band optical density (OD) at 994 cm$^{-1}$ was normalized with the band optical density (OD) at 2365 cm$^{-1}$ by means of the following formula:

Comonomer (F) [% wt]=(OD at 994 cm$^{-1}$)/(OD at 2365 cm$^{-1}$)×0.99.

Specifically, the PEVE or HFP content was determined by FTIR spectroscopy according to the method described in U.S. Pat. No. 5,703,185 (column 4, lines 9-16), using the multiplying coefficient 1, 3 as described therein. In order to carry out the IR spectrum subtraction, a TFE/MVE copolymer was used.

The PMVE content in a polymer was determined under the following conditions: a band optical density (OD) at 889 cm$^{-1}$ was normalized with the band optical density (OD) at 2365 cm$^{-1}$ by means of the following formula:

PMVE [% wt]=(OD at 889 cm$^{-1}$)/(OD at 2365 cm$^{-1}$)×11.8

The PPVE content was determined under the following conditions: a band optical density (OD) at 994 cm$^{-1}$ is normalized with the band optical density (OD) at 2365 cm$^{-1}$ by means of the following formula:

PPVE [% wt]=(OD at 994 cm$^{-1}$)/(OD at 2365 cm$^{-1}$)×0.99

Materials

Polymer samples named are TFE/PAVE copolymers commercially available from Solvay Specialty Polymers Italy SpA, under the trade name of Hyflon® MFA P125X (PVE content: 1.7% wt), HYFLON® PFA P450 (PVE content: 4.2% wt) and HYFLON® PFA P420 (PVE content: 4% wt).

Fluorination

Specimens of certain of aforementioned TFE/PAVE copolymers were preliminarily submitted to extensive fluorination so as to fluorinate all terminal groups and reduce until undetectable amounts groups comprising hydrogen, oxygen and ethylenically unsaturated double bonds. Fluorinated counterparts are designated below with —(F$_2$) suffix.

Annealing Procedure

Polymer samples as received was melt and subjected to MFI determination, shown as "original" MFI value in Table 1. The MFI value was re-measured for each treated polymer, as a function of duration of heat treatment at 300° C. as indicated in Table 2.

As shown in Table 2, the MFI of each tested PFA polymer significantly decreased after receiving the heat treatment.

TABLE 1

| Time of heat treatment at 300° C. (h) | MFI (g/10') | MFI/MFI° |
|---|---|---|
| P125X | | |
| 0 | 1.8 | 1 |
| 24 | 1.5 | 0.83 |
| 48 | 1.27 | 0.7 |
| 168 | 0.76 | 0.42 |
| 336 | 0.65 | 0.36 |
| 1056 | 0.482 | 0.27 |
| P125X-(F$_2$) | | |
| 0 | 2.4 | 1 |
| 3 | 2.4 | 1 |
| 6 | 2.4 | 1 |
| 24 | 2.4 | 1 |
| 48 | 2.4 | 1 |
| 168 | 2.4 | 1 |

TABLE 2

| Time of heat treatment at 300° C. (h) | MFI (g/10') | MFI/MFI° |
|---|---|---|
| P420 | | |
| 0 | 1.9 | 1 |
| 24 | 1.5 | 0.78 |
| 528 | 1.0 | 0.52 |
| P420-(F$_2$) | | |
| 0 | 1.9 | 1 |
| 24 | 1.9 | 1 |
| 168 | 1.9 | 1 |

TABLE 3

| Time of heat treatment at 300° C. (h) | Flex Life (cycles) | MFI (g/10') | MFI/MFI° |
|---|---|---|---|
| P450 | | | |
| 0 | 2660 | 15.4 | 1 |
| 3 | | 13.7 | 0.89 |
| 6 | | 12 | 0.78 |
| 24 | 22090 | 8.5 | 0.55 |
| 48 | 126985 | 5.45 | 0.36 |
| 168 | | 4.07 | 0.26 |
| 336 | | 3.63 | 0.23 |

Determination of End Groups

End groups were determined by Fourier Transform IR spectroscopy according to the method described in PIANCA, M., et al. *J. Fluor. Chem.* 1999, p. 95-71. on samples of cold pressed specimens having a 5 mm diameter and thickness from 50 to 300 microns, using Nicolet® Nexus FT-IR equipment (256 scans, spectral range 4000-400 cm$^{-1}$, resolution 2 cm$^{-1}$). Results determined on samples before and after annealing are detailed in the following table:

TABLE 4

| | End groups (mmol/kg) | | | | | | |
|---|---|---|---|---|---|---|---|
| | COOH | COF | CONH$_2$ | CF=CF$_2$ | CH$_2$CH$_3$ | CF$_2$H | TOT |
| P125X | 2.1 | n.d. | 0.4 | n.d. | 2.6 | 0.4 | 5.5 |
| P125X-HT* | 0.1 | 3.3 | n.d. | n.d. | n.d. | n.d. | 3.4 |
| P125X-(F$_2$) | n.d. | n.d. | n.d. | n.d. | n.d. | n.d. | n.d. |
| P420 | 2.6 | 0.5 | 0.06 | 0.5 | 2 | 0.8 | 6.46 |
| P420-(F$_2$) | n.d. | n.d. | n.d. | n.d. | n.d. | n.d. | n.d. |
| P450 | 8 | 0.6 | n.d. | 1.5 | 3.5 | n.d. | 13.6 |
| P450-HT** | n.d. | 2.6 | n.d. | n.d. | n.d. | n.d. | 2.6 | n.d.: not detectable;
*P125X-HT is P125X after 1056 hours of heat treatment at 300° C.;
**P450-HT is P450 after 336 hours of heat treatment.

The invention claimed is:

1. A method for heat treating a composition (C) which contains at least one melt-processible perfluoropolymer [polymer (F)], the process comprising at least the step of heat-treating the composition (C) at a temperature of at least 260° C., wherein polymer (F) is formed of tetrafluoroethylene (TFE) copolymer with one or more perfluorinated comonomers [comonomer (F)] containing at least one ethylene unsaturation in amounts from 0.5% to 13% by weight, and wherein polymer (F) possesses reactive end groups comprising at least one of the group consisting of hydrogen atoms, oxygen atoms and ethylenically unsaturated double bonds in an amount of at least 4.5 mmol/kg.

2. The method according to claim 1, wherein said comonomer (F) is selected from:
C$_3$-C$_8$ perfluoroolefins;
CF$_2$=CFOR$_f$ perfluoroalkylvinylethers (PAVE), wherein R$_f$ is a C$_1$-C$_6$ perfluoroalkyl;
CF$_2$=CFOX perfluorooxyalkylvinylethers wherein X is a C$_1$-C$_{12}$ perfluorooxyalkyl having one or more ether groups; or perfluorodioxoles.

3. The method according to claim 2, wherein said comonomer (F) is selected from the following comonomers:
PAVEs selected from perfluoromethylvinylether (PMVE of formula CF$_2$=CFOCF$_3$), perfluoroethylvinylether (PEVE of formula CF$_2$=CFOC$_2$F$_5$), perfluoropropylvinylether (PPVE of formula CF$_2$=CFOC$_3$F$_7$), or mixtures thereof;
perfluoromethoxy vinyl ether (MOVE) of general formula CF$_2$=CFOCF$_2$OR$_{f2}$, wherein R$_{f2}$ is a linear or branched C$_1$-C$_6$ perfluoroalkyl group, cyclic C$_5$-C$_6$ perfluoroalkyl group, a linear or branched C$_2$-C$_6$ perfluoroxyalkyl group; and
perfluorodioxoles having the following formula:

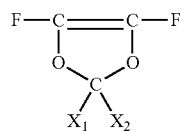

wherein X$_1$ and X$_2$, equal to or different from each other, are selected from F or CF$_3$.

4. The method according to claim 3, wherein said comonomer (F) is selected from PMVE, PEVE, PPVE, MOVE, or combinations thereof.

5. The method according to claim 4, wherein polymer (F) is a TFE copolymer consisting essentially of:
(a) from 0.5 to 8% by weight of recurring units derived from PPVE;
(b) recurring units derived from TFE, in such an amount that the sum of the percentages of the recurring units (a) and (b) is equal to 100% by weight.

6. The method according to claim 1, wherein polymer (F) comprises recurring units derived from at least one C$_3$-C$_8$ perfluoroolefin.

7. The method according to claim 6, wherein polymer (F) is a TFE copolymer consisting essentially of:
(a) from 0 to 6% by weight of recurring units derived from PMVE;
(b) from 0.4 to 5% by weight of recurring units derived from one or more than one fluorinated PAVE comonomer different from PMVE;
(c) from 0 to 6% by weight of recurring units derived from at least one C$_3$-C$_8$ perfluoroolefin; and
(d) recurring units derived from TFE, in such an amount that the sum of the percentages of the recurring units (a), (b), (c) and (d) is equal to 100% by weight.

8. The method according to claim 1, wherein composition (C) contains polymer (F) as the sole component.

9. The method according to claim 1, wherein the temperature of heat treatment for composition (C) is at least 270° C.

10. The method according to claim 1, said process further comprising a step of processing in the molten state the composition (C), so as to provide a solid shaped article, and consequently heat treating said composition (C) under the form of said solid shaped article.

11. The method according to claim 1, wherein polymer (F) is formed of tetrafluoroethylene (TFE) copolymer with one or more comonomer (F) containing at least one unsaturation of ethylene type in amounts from 0.6% to 11% by weight.

12. The method according to claim 1, wherein polymer (F) is formed of tetrafluoroethylene (TFE) copolymer with one or more comonomer (F) containing at least one unsaturation of ethylene type in amounts from 0.8% to 9% by weight.

13. The method according to claim 3, wherein R$_{f2}$ is —CF$_2$CF$_3$, —CF$_2$CF$_2$OCF$_3$, or —CF$_3$.

14. The method according to claim 3, wherein $X_1$ and $X_2$ are each F.

15. The method according to claim 5, wherein polymer (F) is a TFE copolymer consisting essentially of:
   (a) from 0.7 to 6% by weight of recurring units derived from PPVE;
   (b) recurring units derived from TFE, in such an amount that the sum of the percentages of the recurring units (a) and (b) is equal to 100% by weight.

16. The method according to claim 7, wherein polymer (F) is a TFE copolymer consisting essentially of :
   (a) from 0 to 6% by weight of recurring units derived from PMVE;
   (b) from 0.4 to 5% by weight of recurring units derived from PEVE and/or PPVE;
   (c) from 0 to 6% by weight of recurring units derived from hexafluoropropylene (HFP); and
   (d) recurring units derived from TFE, in such an amount that the sum of the percentages of the recurring units (a), (b), (c) and (d) is equal to 100% by weight.

17. The method according to claim 9, wherein the temperature of heat treatment for composition (C) is at least 310° C.

* * * * *